(12) United States Patent
Suzuki et al.

(10) Patent No.: US 7,606,935 B1
(45) Date of Patent: Oct. 20, 2009

(54) SYSTEMS AND METHODS OF AUTOMATIC RETRANSMISSION OF ELECTRONIC MAIL

(75) Inventors: Hiroshi Suzuki, Sagamihara (JP); Takehisa Okazaki, Kanagawa (JP); Hirokazu Yasumuro, Kanagawa (JP); Kenso Arima, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 12/058,853

(22) Filed: Mar. 31, 2008

(51) Int. Cl.
*G06F 15/173* (2006.01)

(52) U.S. Cl. .................. 709/238; 709/219; 709/220; 709/226; 709/242; 709/206

(58) Field of Classification Search ........................ None
See application file for complete search history.

(56) References Cited

U.S. PATENT DOCUMENTS

| | | | |
|---|---|---|---|
| 5,995,597 A * | 11/1999 | Woltz et al. ............... 379/93.24 |
| 6,108,688 A * | 8/2000 | Nielsen ....................... 709/206 |
| 6,175,859 B1 * | 1/2001 | Mohler ........................ 709/206 |
| 6,216,165 B1 | 4/2001 | Woltz et al. |
| 6,327,046 B1 * | 12/2001 | Miyamoto et al. .......... 358/1.15 |
| 6,760,753 B1 * | 7/2004 | Ohgushi et al. ............. 709/206 |
| 6,854,007 B1 | 2/2005 | Hammond |
| 7,085,812 B1 * | 8/2006 | Sherwood .................... 709/206 |
| 2003/0233421 A1 * | 12/2003 | Shibata et al. ............... 709/206 |
| 2004/0249890 A1 | 12/2004 | Fellenstein et al. |
| 2005/0073665 A1 * | 4/2005 | Taniguchi et al. ............. 355/53 |
| 2005/0219640 A1 * | 10/2005 | Kasatani ...................... 358/402 |
| 2007/0061423 A1 | 3/2007 | Accapadi et al. |

OTHER PUBLICATIONS

EP0924903A1 of Toyoda et al., Jun. 23, 1999.
EP0813161A2 of Nielsen, Dec. 17, 1997.
Information Dissemination With Listservers, by Sedore, 1996.

* cited by examiner

*Primary Examiner*—Dohm Chankong
(74) *Attorney, Agent, or Firm*—Jackson Patent Law Office

(57) ABSTRACT

Disclosed are systems and methods of automatic retransmission of electronic mail.

1 Claim, 11 Drawing Sheets

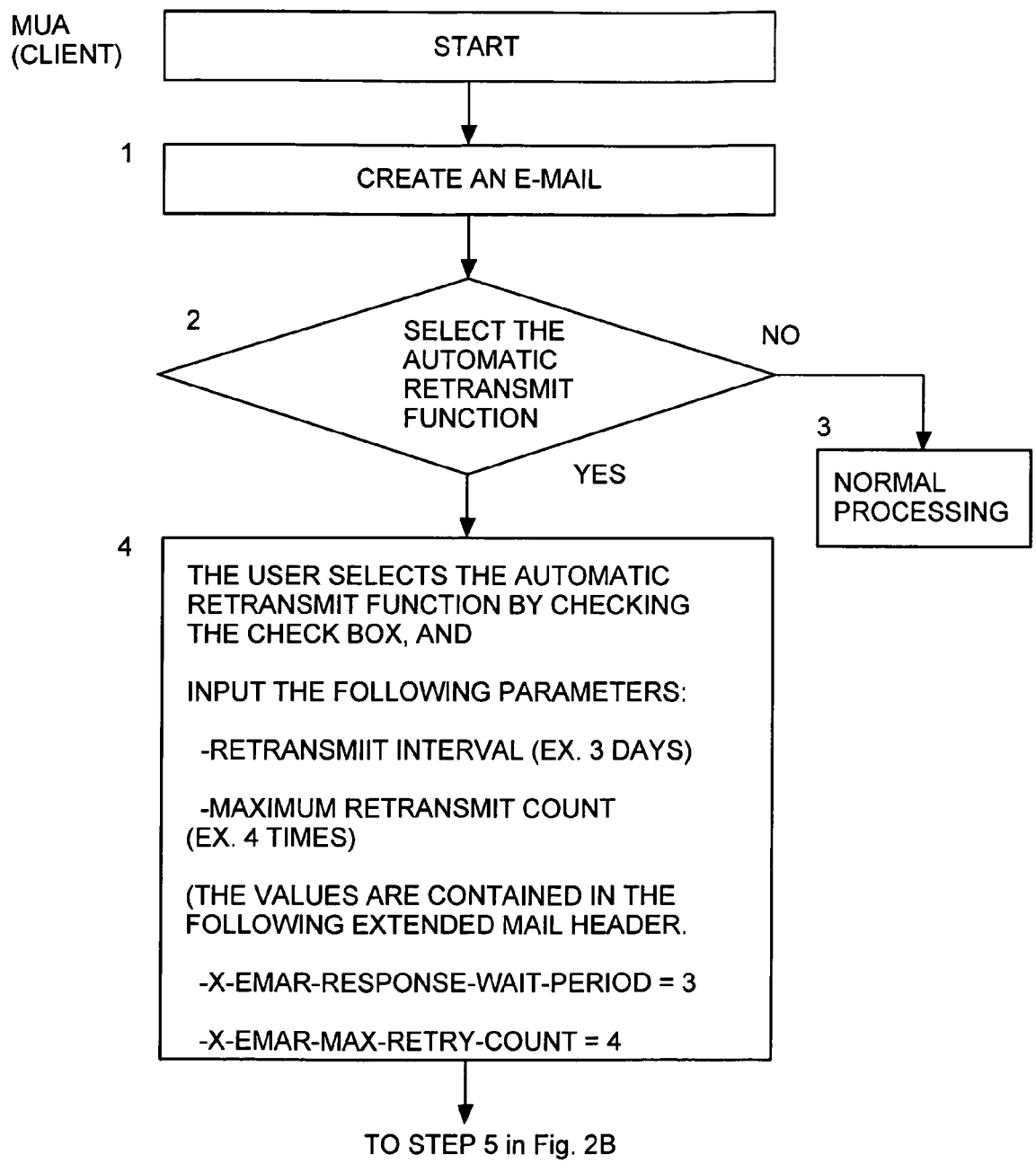

| MAIN KEY 220 | RETRANSMIT COUNT 225 | RETRANSMIT INTERVAL 230 | MAXIMUM RETRANSMIT COUNT 235 | MAIL DATA (MESSAGE) 240 |
|---|---|---|---|---|
| <50506.70.132... | 1 | 2 | 5 | "Date: Fri, 8 Feb 2008 16... |
| <50506.70.012... | 0 | 1 | 10 | |
| <50506.40.132... | 4 | 1 | 30 | |
| <52506.70.132... | 6 | 1 | 7 | |
| ... | ... | | | |
| <50506.70.152... | 1 | 2 | 5 | |

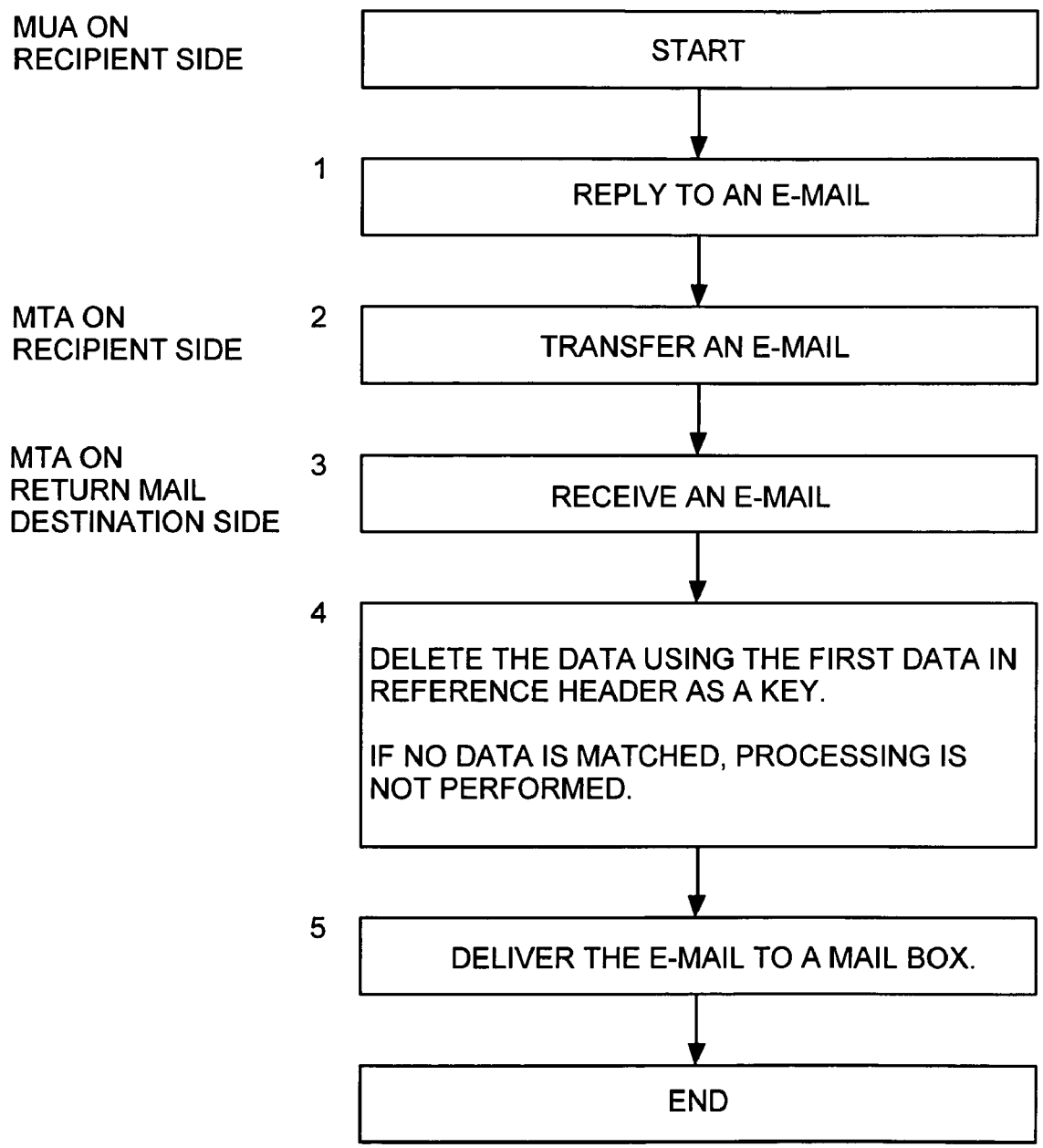

201 ⟶

To: ms_b@b.com
Subject: Sales Figures
Message-ID: <OF951F9DDB.0DA98223-
ON85257411.006F9A21-
85257411.00705A11@a.com>
From: mister_a@acom>
Date: Wed, 19 Mar 2008 16:22:40 -0400
-X-EMAR-RESPONSE-WAIT-PERIOD = 3
-X-EMAR-MAX-RETRY-COUNT = 4

Ms. B,

Do we know the sales figures for the Model X123?

Sincerely,

To: ms_b@b.com
Subject: Sales Figures
Message-ID: <OF951F9DDB.0DA98223-
ON85257411.006F9A21-
85257411.00705A11@a.com>
From: mister_a@acom>
Date: Wed, 19 Mar 2008 16:22:40 -0400

Ms. B,

Do we know the sales figures for the Model X123?

Sincerely,

Mr. A

SYSTEMS AND METHODS OF AUTOMATIC RETRANSMISSION OF ELECTRONIC MAIL

BACKGROUND OF THE INVENTION

1. Field of the Invention

The invention relates generally to communication and, more particularly, to systems and methods of automatic retransmission of electronic mail.

2. Description of Related Art

If a user has sent an e-mail requiring a reply, the user may open a mailbox to determine whether or not a reply e-mail has been received. If after a certain period a return e-mail has not been received the user may send an e-mail asking for a reply. If a reply is still not received, the user may resend an e-mail asking for a reply. With such manual management, in the case of sending a large number of e-mails requiring a reply or in the case where the deadline for reply varies among e-mails, the sender may miss the deadline for reply. In addition, such manual management wastes time.

SUMMARY OF THE INVENTION

To address this problem, there is a method comprising generating a first e-mail with an e-mail header containing a retransmit interval set at a workstation, and a retransmit maximum count set at the workstation; sending the first e-mail to a first server; removing the retransmit interval and retransmit maximum count from the first e-mail header; sending the first e-mail; querying a database to determine if a reply has been received to the first e-mail; resending the first e-mail if the reply has not been received; generating a second e-mail with an e-mail header containing a retransmit interval set at a second workstation, and a retransmit maximum count set at the second workstation; sending the second e-mail to the first server; removing the retransmit interval and retransmit maximum count from the e-mail header of the second e-mail; and sending the second e-mail. The removing, querying, and resending steps above are effected by a processor executing a set of instructions, and the method further includes the following steps are effected by the processor executing the set of instructions querying a database to determine if a reply has been received to the second e-mail; and resending the second e-mail if the reply has not been received.

BRIEF DESCRIPTION OF THE DRAWINGS

References are made to the following text taken in connection with the accompanying drawings, in which:

FIGS. 2A, 2B, and 2C constitute a flowchart of a processing performed in the exemplary system.

FIG. 3 is a diagram showing a data record structure in the exemplary system.

FIG. 5 is a flowchart of yet another processing performed in the exemplary system.

FIGS. 6A and 6B are diagrams showing e-mail messages at different processing stages.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

Figure 1A:
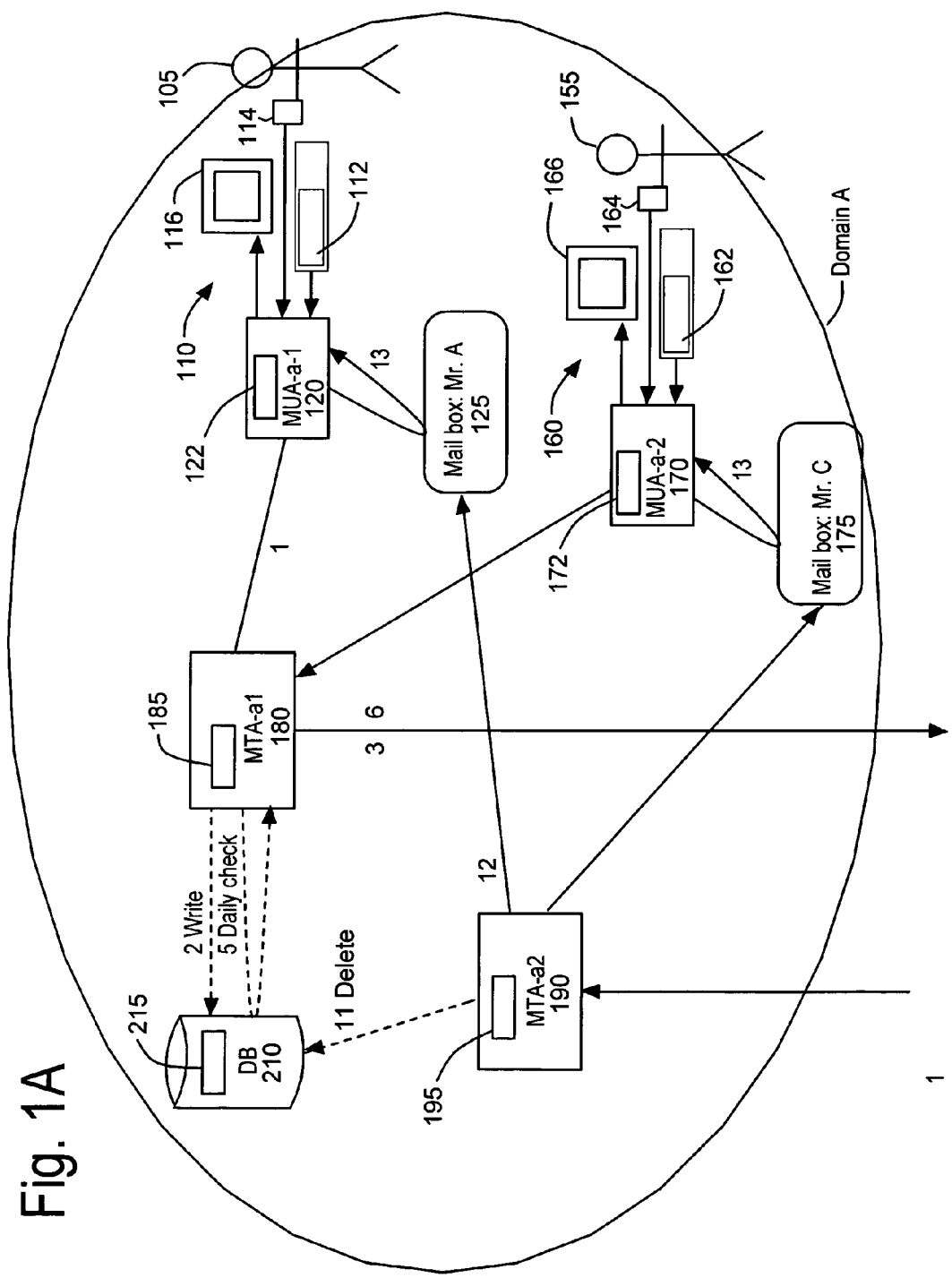
FIGS. 1A and 1B constitute a diagram of an exemplary electronic mail system in accordance with an embodiment of the present invention.
Figure 1B:
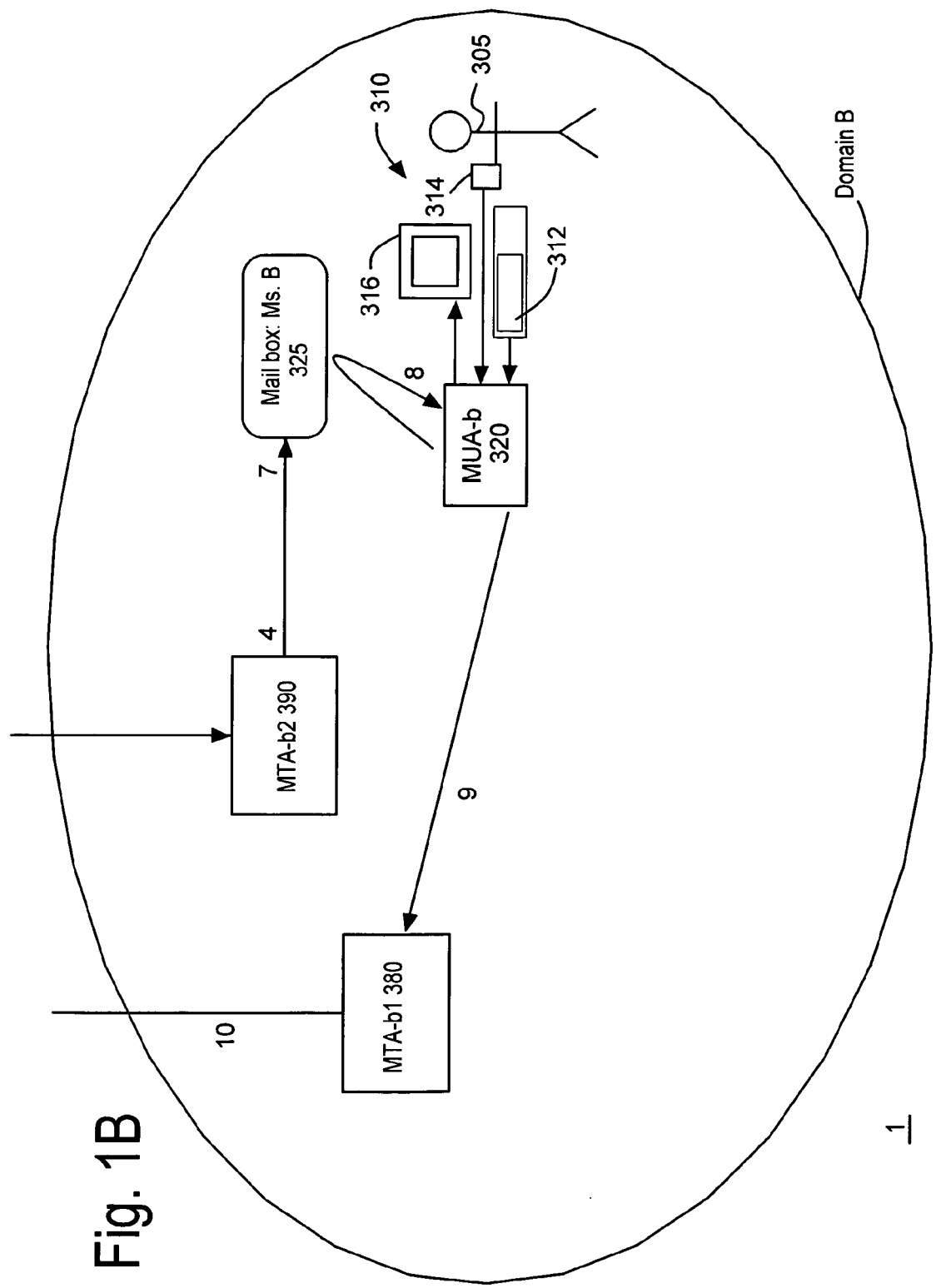

FIGS. 1A and 1B show an exemplary electronic mail system 1 including mail transfer agent a1 (MTA-a1) 180 (mail server) that effects a process 185. Process 185 is carried out by a set of instructions executed by a general purpose electronic processor.

System 1 also includes mail user agent a-1 (MUA-a-1) 120 (mail client) that effects a process 122, carried out by a second set of instructions executed by a second general purpose electronic processor; mail user agent a-2 (MUA-a-2) 170 (another mail client) that effects a process 172, carried out by a third set of instructions executed by a third general purpose electronic processor; mail transfer agent a-2 (MTA-a2) 190 (mail server) that effects a process 195, carried out by a fourth set of instructions executed by a fourth general purpose electronic processor; and database 210 having a data structure 215.

System 1 transfers an e-mail from person 105, Mr. A, a sender in Domain A, to person 305, Ms. B, a destination in Domain B.

The automatic retransmit function is realized only by processors, instructions, and data on the sender side, in domain A. For example, the e-mail automatic retransmit function can be used by loading e-mail software equipped with this function to a system of one's own company.

A conventional MUA and MTA may be employed on the destination side, in domain B.

In FIGS. 1A and 1B, (1) to (4) represent a flow of sending an automatic-retransmit-function-equipped e-mail and delivering the e-mail to a destination.

Figure 6B:

(1): The automatic retransmit function is selected in creating an e-mail and sending it from workstation 110. FIG. 6A shows e-mail 201 represented by (1) in FIG. 1A.

Workstation 110 includes a processor executing mail user agent 120, a mouse 114 upstream in a signal path from mail user agent 120, a keyboard 112 upstream in a signal path from mail user agent 120, and a display 116 downstream in a signal path from mail user agent 120. Person 105 manipulates keyboard 1 12 and mouse 114 to construct an e-mail message.

(2): An MTA-a1 180 writes the e-mail to a database 210 using Message-ID of the e-mail as a key.

(3): The e-mail is transferred to a destination, in domain B.

(4): The e-mail is delivered to a mailbox 325 on the destination side. In FIGS. 1A and 1B, (5) to (7) represent a flow of reading e-mails from the database 210 and resending an e-mail set to be retransmitted on that day:

(5): The MTA-a1 reads all of the e-mails from the database 210 once a day, and checks the retransmit date of each e-mail.

(6): An e-mail, of which the retransmit date is today, is transferred to a destination.

(7): The e-mail is delivered to the mailbox on the destination side.

In FIGS. 1A and 1B, (8) to (13) represent a flow when a recipient receives and replies an e-mail:

(8): The recipient receives an e-mail from a mailbox.

(9): The recipient replies to the e-mail.

(10): The return mail is transferred to a return address.

(11): The MTA-a2 on the return mail destination side deletes the e-mail from the database using Message-ID in a reference header of the received e-mail as a key.

(12): The e-mail is delivered to a mailbox on the return mail destination side.

(13): The sender receives the return mail.

Figure 2B:
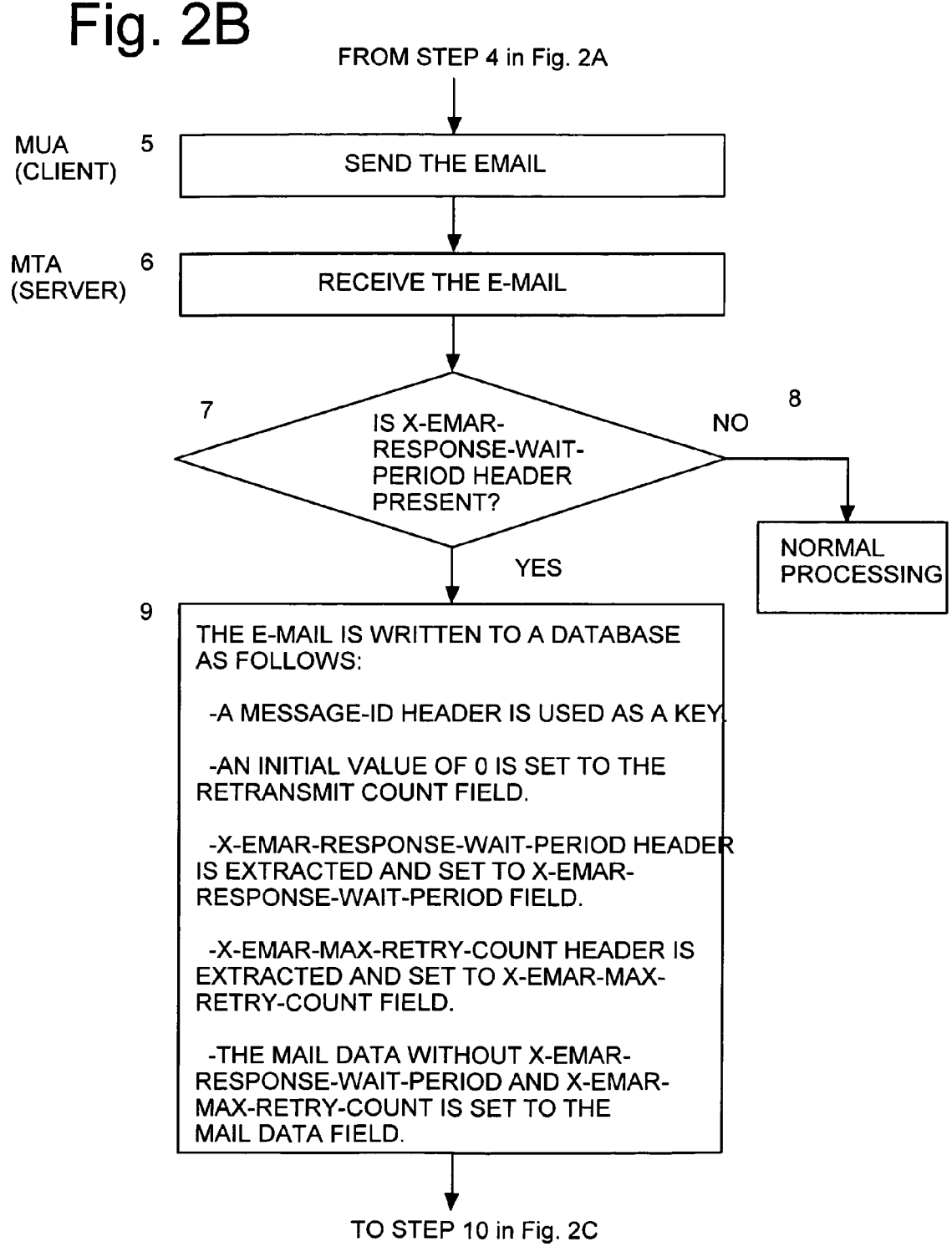
Figure 2C:
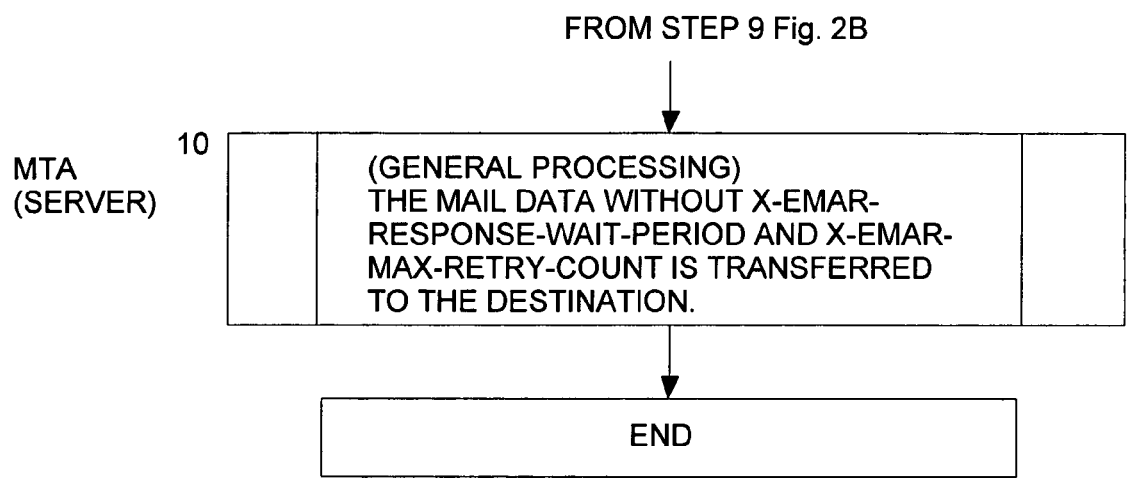

FIGS. 2A, 2B, and 2C show a flowchart of a processing for sending an e-mail. Person 105 selects the automatic retransmit function at workstation 110 and enters desired "retransmit interval (days)" and "maximum retransmit count". (steps 1, 2 and 4). As a result, the following two extended mail headers are added to the e-mail: 1) X-EMAR-Response-Wait-Period, specifying a retransmit interval; and 2) X-EMAR-Max-Retry-Count, specifying the maximum retransmit count.

MUA-a-1 120 sends e-mail 201 (FIG. 6a) to MTA-a1 180 at an address of SMTP server in the configuration of the MUA-a-1 120 (step 5).

MTA-a1 180 receives the e-mail 201 sent in step 5 (step 6), and MTA-a1 180 checks whether or not the X-EMAR-Response-Wait-Period header is present in the e-mail. (step 7). If the X-EMAR-Response-Wait-Period header is not present, the e-mail is transferred to a destination. (step 8). If the X-EMAR-Response-Wait-Period header is present, the e-mail is written to a database as shown in step 9:

A Message-ID header in the e-mail is used as a key.

An initial value of 0 is set to the retransmit count field.

The X-EMAR-Response-Wait-Period header is extracted from e-mail data and set to the retransmit interval field.

Likewise, the X-EMAR-Max-Retry-Count header is extracted and set to the maximum retransmit count field.

The mail data including neither the X-EMAR-Response-Wait-Period header nor the X-EMAR-Max-Retry-Count header is set to the mail data field. In other words, MTA-a1 180 deletes or removes the X-EMAR-Response-Wait-Period header and the X-EMAR-Max-Retry-Count header.

MTA-a1 180 then sends e-mail 202 (FIG. 6B), including neither the X-EMAR-Response-Wait-Period header nor the X-EMAR-Max-Retry-Count header, to the destination. E-mail 202 is represented by (3) in FIG. 1A. (step 10).

FIG. 3 is a diagram representing data structure 215 in database 210. Main key field 220 is a value of a Message-ID generated first with the MUA-a-1 120. Retransmit count field 225 is the number of times the e-mail has been retransmitted, and has an initial value of 0. Retransmit interval field 230 is a value of the X-EMAR-Response-Wait-Period header. Maximum retransmit count field 235 is a value of the X-EMAR-Max-Retry-Count header. Mail data (message) field 240 is the mail data including neither the X-EMAR-Response-Wait-Period header nor the X-EMAR-Max-Retry-Count header.

Figure 4A:
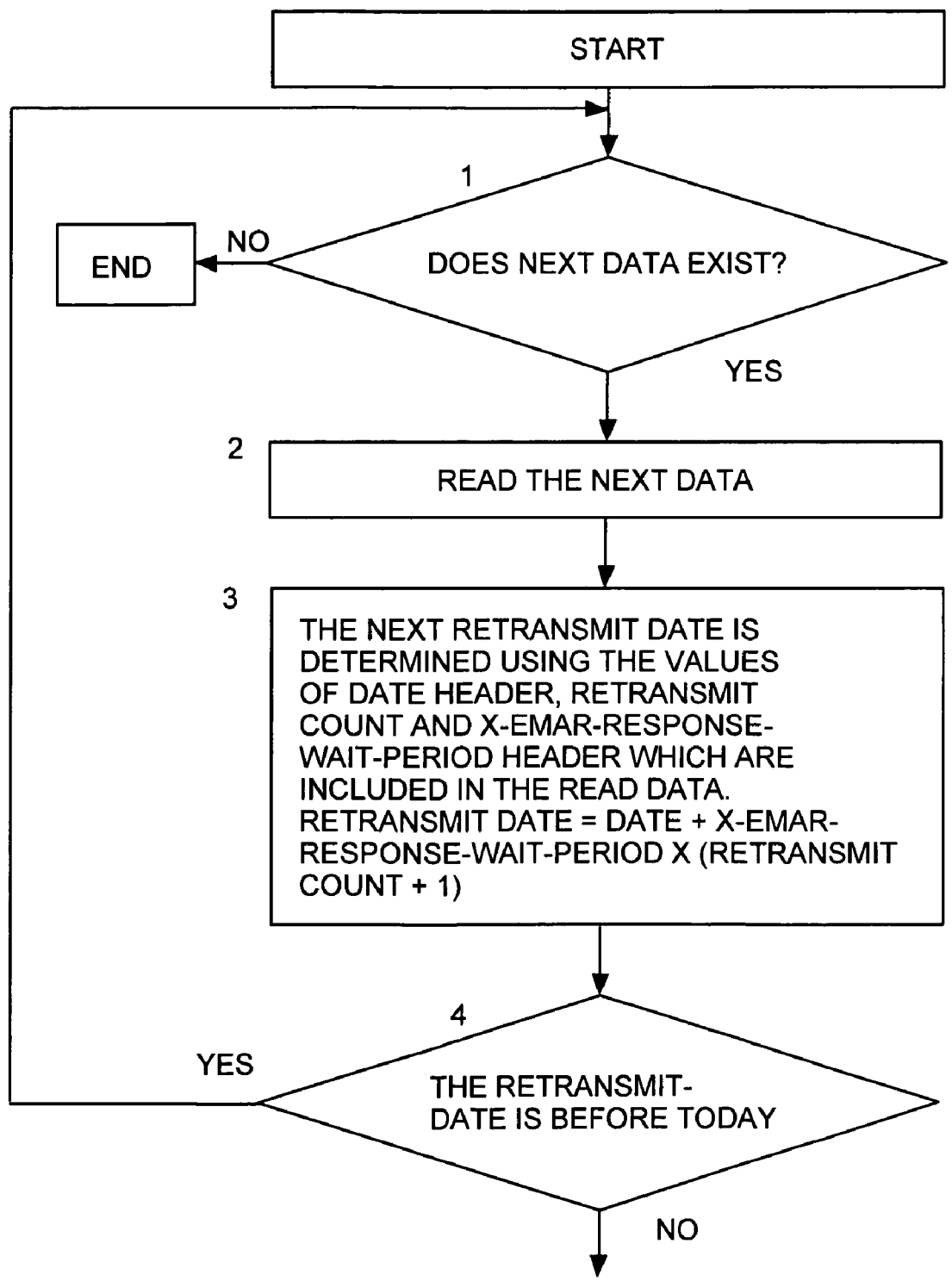
FIGS. 4A, and 4B constitute a flowchart of another processing performed in the exemplary system.
Figure 4B:
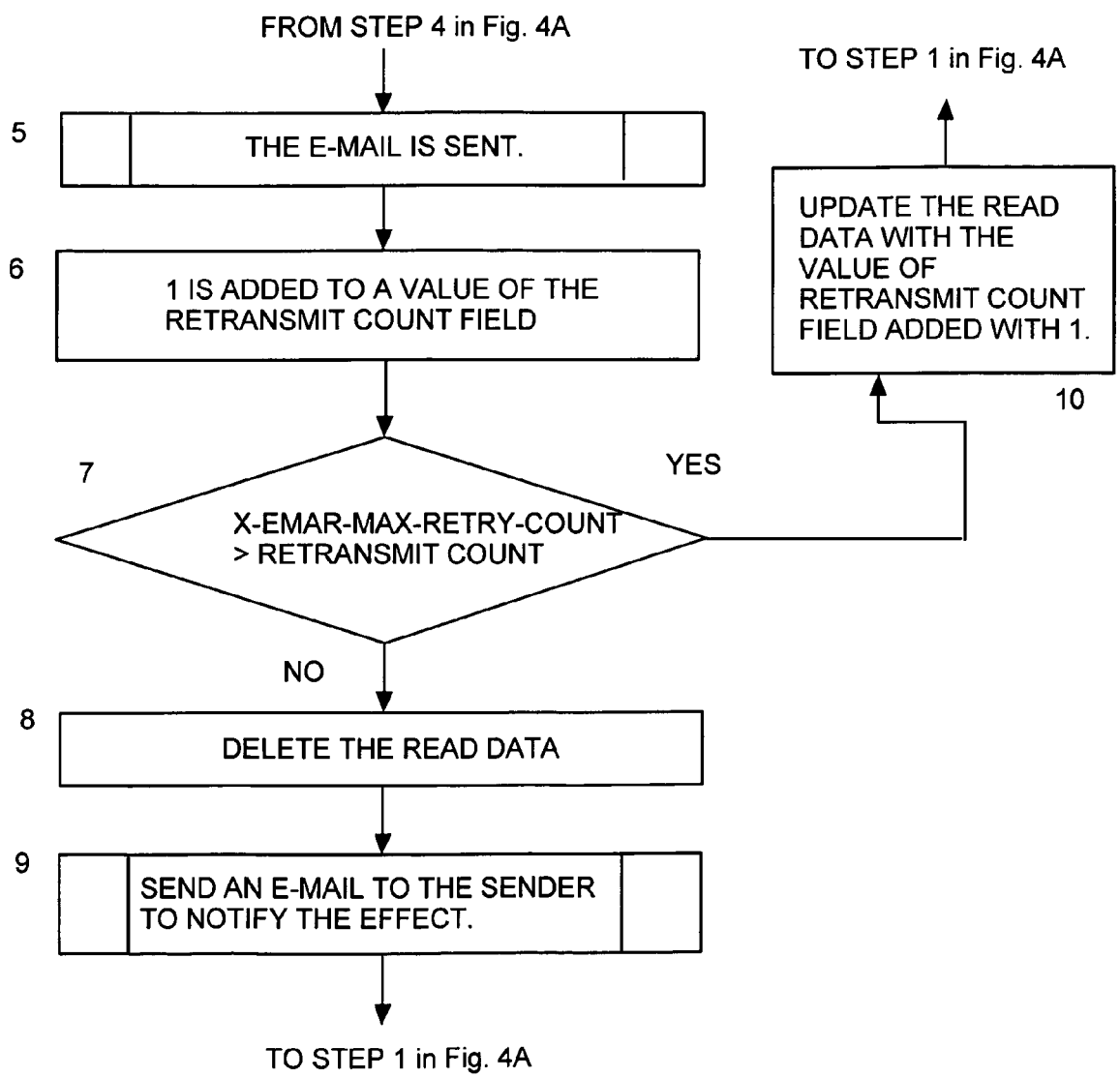

FIGS. 4A, and 4B show a flowchart of the e-mail automatic retransmit processing. A processor executing instructions 185 in MTA-a1 180 acts to periodically read data (e-mails) one by one from database 210 once a day, as a nighttime batch job for example. (steps 1 and 2). In other words, step 2 includes reading a row from data structure 215.

Process 185 of MTA-a1 accesses data structure 215 in database 210, to determine the next retransmit date depending on date header (header including the transmission date) in mail data field 240, X-EMAR-Response-Wait-Period header retransmit interval field 230, and retransmit count in retransmit count field 225.

The next retransmit date is determined by adding a value of X-EMAR-Response-Wait-Period x (retransmit count+1) to a value of the Date header. (step 3).

Process 185 compares the retransmit date to the machine date set in the MTA-a1 180 (today). If the retransmit date is on or after today, process 185 causes the e-mail to be sent again. (steps 4 and 5).

The e-mail to be sent again corresponds to data read from mail data field 240 (from which X-EMAR-Response-Wait-Period and X-EMAR-Max-Retry-Count are deleted).

Process 185 adds 1 to a value of the retransmit count field 225 in the data read from the DB. (step 6). Process 185 determines whether or not the retransmit count reaches the value stored in the maximum retransmit count field 235. (step 7). If the retransmit count reaches the maximum retransmit count, process 185 deletes the data read in step 2 from database 210, and automatically sends an e-mail from MTA-a1 to MUA-a-1, the mail user agent of the sender (person 105) to notify to that effect. (steps 8 and 9). If the retransmit count does not reach the maximum retransmit count, process 185 updates the data read in step 2 with the value of retransmit count added with 1 in step 6. (step 10). In other words, step 10 includes writing into a row of data structure 215.

Process 185 performs the processing of FIGS. 4A and 4B, to process each row in data structure 215.

FIG. 5 is a flowchart of processing of replying to an e-mail and deleting data from a database.

Person 305, a recipient of the e-mail, replies to an automatic-retransmit-function-equipped e-mail. (step 1).

The return mail is sent to MTA-b1 380 at an address set in the configuration of the MUA-b 320 and transferred to the MTA-a2 190 on the return mail destination side. (steps 2 and 3).

Process 195 deletes a corresponding row from data structure 215, using the first data in the Reference header of the return mail (storing Message-ID generated first) as a key. If no data is matched, processing is not performed. (step 4).

Process 195 causes the return mail to be delivered to a mailbox on the return mail destination side. (step 5)

Thus, a sender who is about to send an e-mail requiring a reply, selects an automatic retransmit function at the time of creating the e-mail, sets the "retransmit interval (days)" and the "maximum retransmit count", and then sends the e-mail. The retransmit interval (days) and the maximum retransmit count are set in certain mail headers and sent together with the e-mail.

If the mail server in the source domain receives the automatic-retransmit-function-equipped e-mail, the server writes the e-mail to the automatic retransmit function database and then forwards the e-mail to the destination like a general e-mail.

The mail server checks all of the e-mails in the database every day. On the retransmit day (calculated on the basis of retransmit interval), the server sends the e-mail again. The server deletes an e-mail that reached the maximum retransmit count from the database and sends an e-mail to notify the sender to that effect.

If an e-mail recipient sends a reply, the return mail is forwarded to the mail server on the sender side. If the return mail is equipped with an automatic retransmit function, the mail server deletes the e-mail from the database. The return mail is sent as in general processing.

In summary, person 105 manipulates mouse 114 and/or keyboard 112 to cause MUA-a-1 120 to generate an e-mail with an e-mail header containing a retransmit interval chosen by person 105, and a retransmit maximum count chosen by person 105. 120 sends the e-mail to MTA-a1 180. MTA-a1 180 removes the retransmit interval and retransmit maximum count from the e-mail header, and sends the resultant e-mail to MTA-b2 390. Periodically, MTA-a1 180 queries database 210 to determine if there is an e-mail of which retransmit date is on or after today, and resends it if it exists. Thus, MTA-a1 180 effectively queries database 210 to determine if a reply has been received to the e-mail from MUA-a-1 120, and resends the e-mail if a reply has not been received.

MTA-a1 180 is common to MUA-a-1 120, of person 105, and MUA-a-2 170, of person 155. Thus, person 155 manipulates mouse 164 and/or keyboard 162 to cause MUA-a-2 170 to generate an e-mail with an e-mail header containing a retransmit interval chosen by person 155, and a retransmit maximum count chosen by person 155. MUA-a-2 170 sends the e-mail to MTA-a1 180. MTA-a1 180 removes the retransmit interval and retransmit maximum count from the e-mail header, and sends the resultant e-mail to MTA-b-2 390. Periodically, MTA-a1 180 queries database 210 to determine if there is an e-mail of which retransmit date is on or after today, and resends it if it exists. Thus, MTA-a1 180 effectively queries database 210 to determine if a reply has been received to the e-mail from MUA-a-2 170, and resends the e-mail if a reply has not been received.

In other words, the querying and resending for the e-mail from person 105 are effected by a processor executing a set of instructions, and the querying and resending for the e-mail from person 155 are effected by the same processor executing the same act of instructions.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

The invention claimed is:

1. A method comprising:

generating a first e-mail with an e-mail header containing a first interval set at a workstation, and a first retransmit maximum count set at the workstation;

sending the first e-mail to a first server;

removing the first interval and retransmit maximum count from the first e-mail header at the first server and subsequently sending the first e-mail from the first server with the first interval and retransmit maximum count removed from the first e-mail header;

querying a database to determine if the first interval has elapsed since the first e-mail has been sent and a reply has not been received to the first e-mail;

conditionally resending the first e-mail depending on a result of the previous step;

querying the database to determine if the following condition is true: the first interval has elapsed since the first e-mail has been sent and a reply has not been received to the first e-mail;

conditionally resending the first e-mail depending on a result of the previous step;

comparing the first retransmit maximum count to a number times the first e-mail has been sent;

conditionally sending an e-mail to the workstation, depending on a result of the previous step;

generating a second e-mail with an e-mail header containing a second interval set at a second workstation, and a second retransmit maximum count set at the second workstation;

sending the second e-mail to the first server;

removing the second interval and retransmit maximum count from the e-mail header of the second e-mail at the first server and subsequently sending the second e-mail from the first server with the second interval and retransmit maximum count removed from the second e-mail header, wherein the removing, querying, and resending steps above are effected by a processor executing a set of instructions, and the following steps are effected by the processor executing the set of instructions;

querying a database to determine if the second interval has elapsed since the second e-mail has been sent and a reply has not been received to the second e-mail;

conditionally resending the second e-mail depending on a result of the previous step;

querying the database to determine if the following condition is true: the second interval has elapsed since the second e-mail has been sent and a reply has not been received to the second e-mail;

conditionally resending the second e-mail depending on a result of the previous step;

comparing the second retransmit maximum count to a number times the second e-mail has been sent; and conditionally sending an e-mail to the second workstation, depending on a result of the previous step.

* * * * *